March 30, 1926.
R. C. PIERCE
WELDING AND CUTTING APPARATUS
Filed Nov. 5, 1920
1,578,917
4 Sheets-Sheet 1
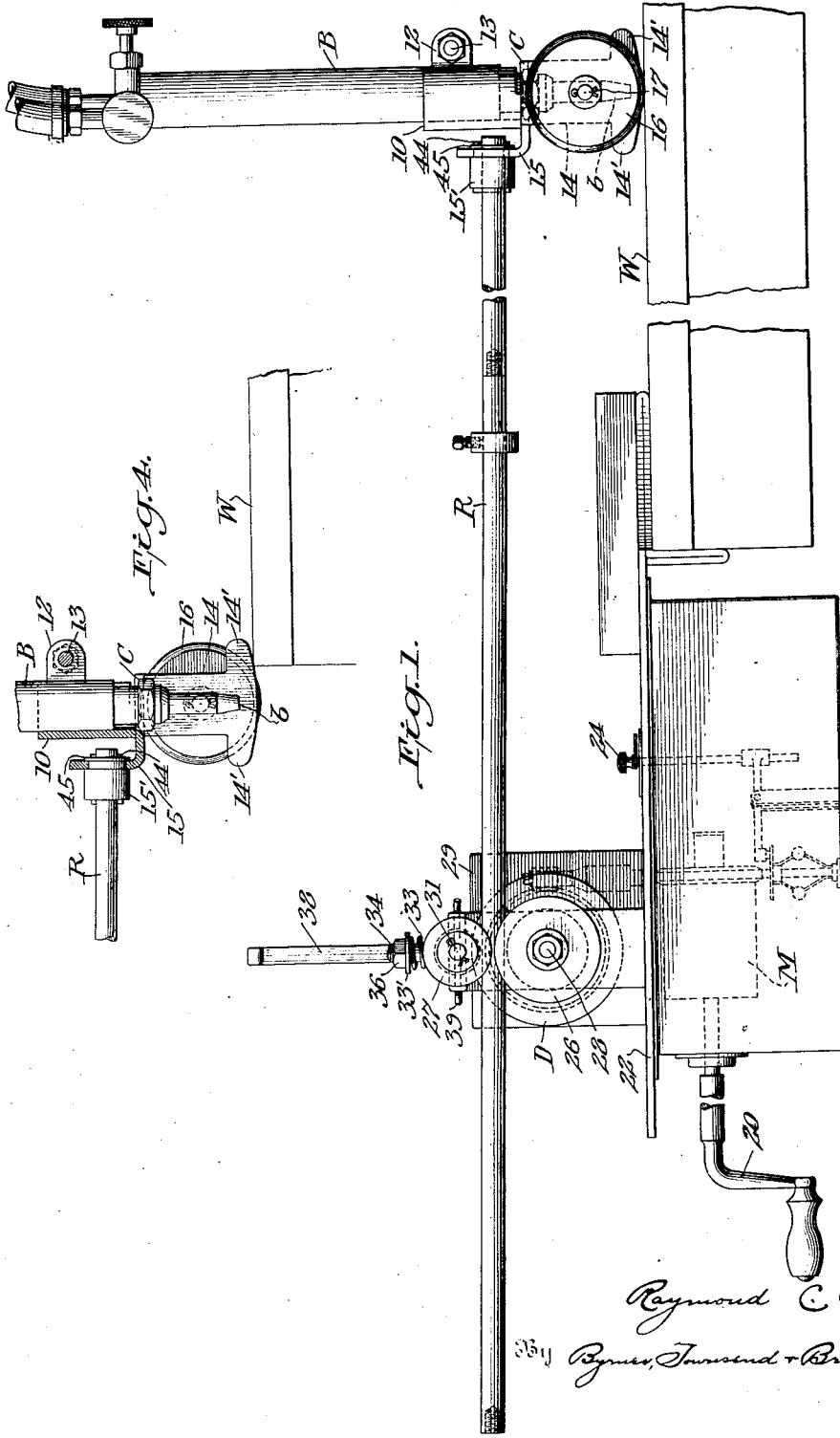

March 30, 1926.
R. C. PIERCE
WELDING AND CUTTING APPARATUS
Filed Nov. 5, 1920
1,578,917
4 Sheets-Sheet 2
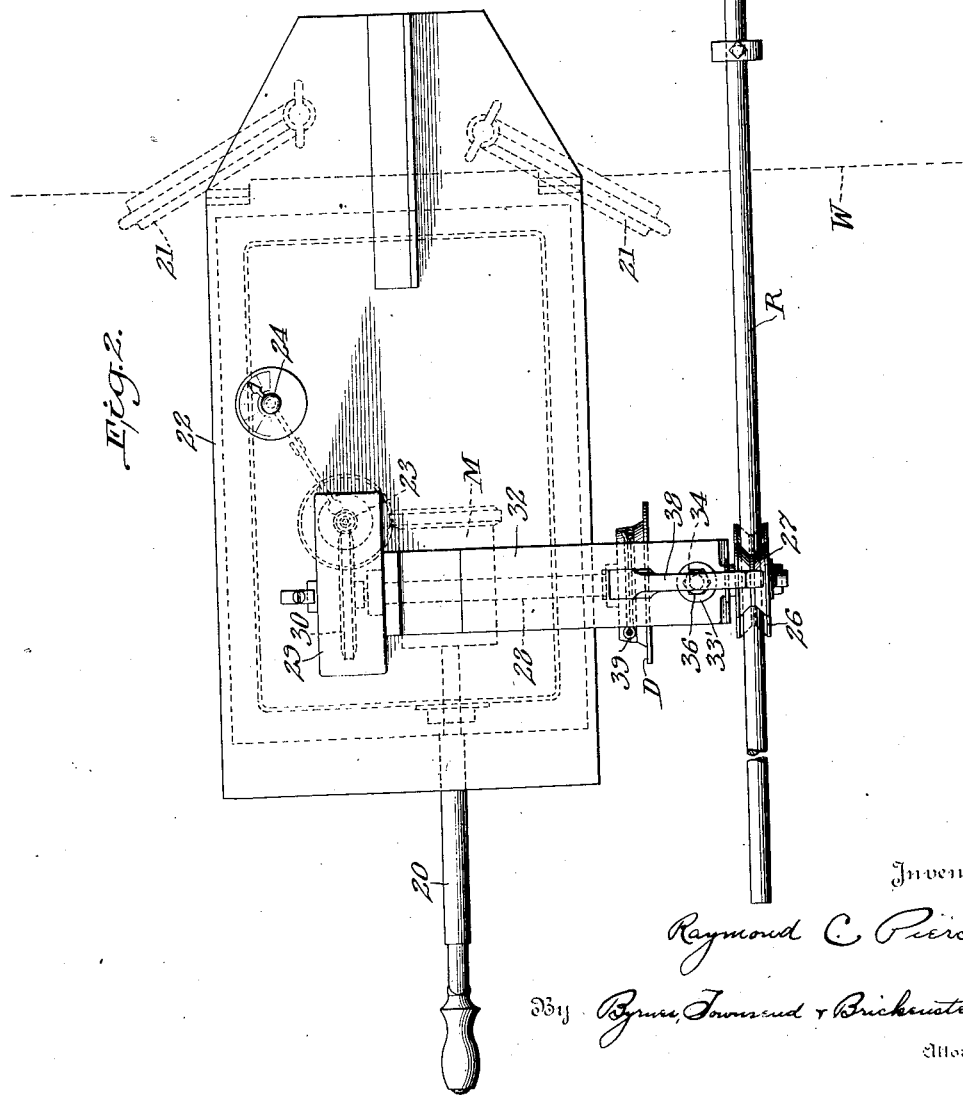
Inventor:
Raymond C. Pierce,
By Byrnes, Townsend & Brickenstein,
Attorneys.

March 30, 1926.
R. C. PIERCE
1,578,917
WELDING AND CUTTING APPARATUS
Filed Nov. 5, 1920  4 Sheets-Sheet 3
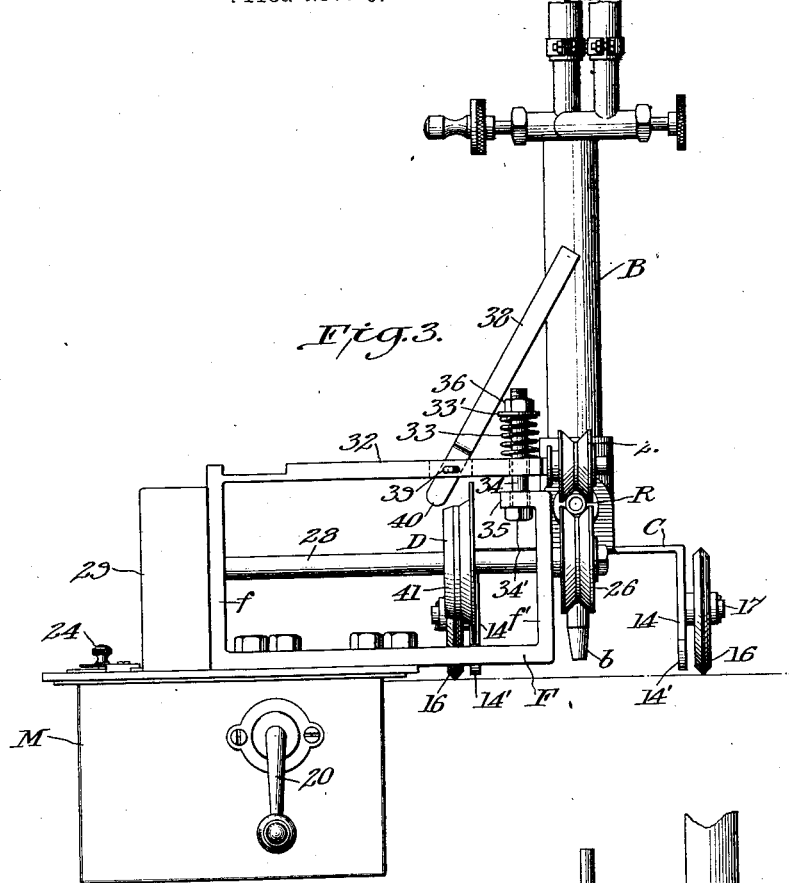
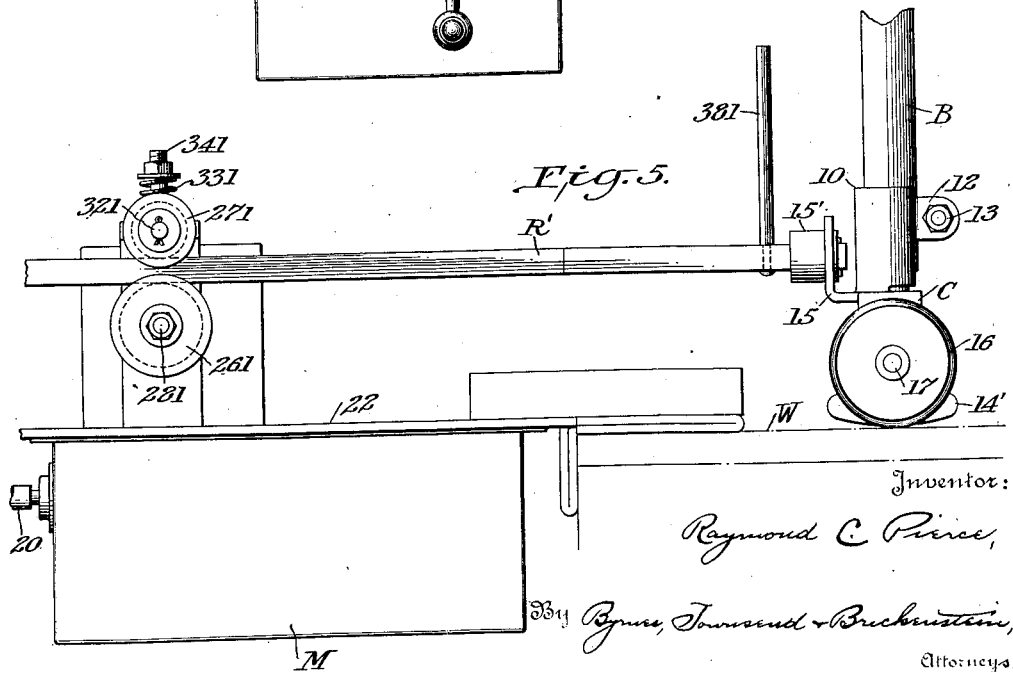
Inventor:
Raymond C. Pierce,
By Byrnes, Townsend & Breckinstein,
Attorneys.

March 30, 1926.
R. C. PIERCE
1,578,917
WELDING AND CUTTING APPARATUS
Filed Nov. 5, 1920    4 Sheets-Sheet 4
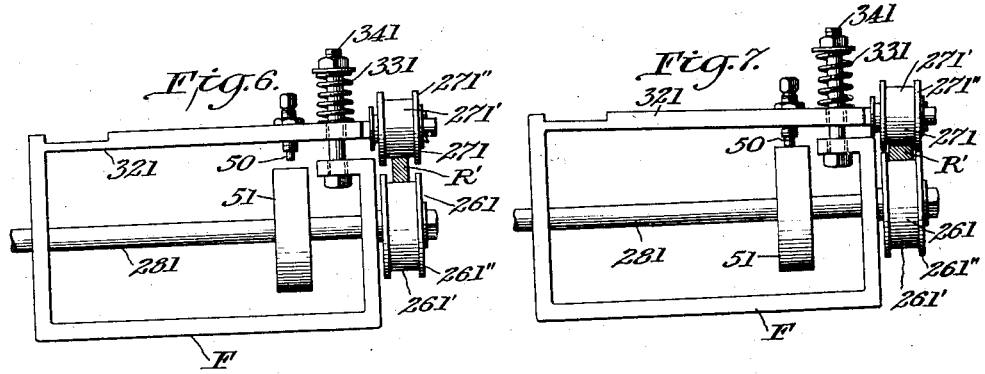
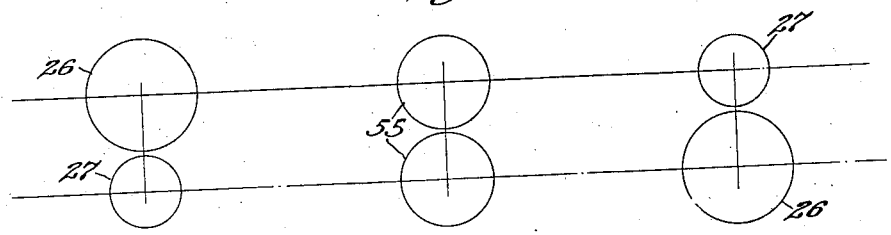
Inventor:
Raymond C. Pierce
By Byrnes, Townsend & Brickenstein,
Attorneys.

Patented Mar. 30, 1926.

1,578,917

UNITED STATES PATENT OFFICE.

RAYMOND C. PIERCE, OF NEW YORK, N. Y., ASSIGNOR TO THE LINDE AIR PRODUCTS COMPANY, A CORPORATION OF OHIO.

WELDING AND CUTTING APPARATUS.

Application filed November 5, 1920. Serial No. 421,961.

*To all whom it may concern:*

Be it known that I, RAYMOND C. PIERCE, a citizen of the United States, residing at 472 W. 144th Street, New York city, in the county of New York and State of New York, have invented certain new and useful Improvements in Welding and Cutting Apparatus, of which the following is a specification.
This invention relates to welding and cutting apparatus and particularly to apparatus employing a blow-pipe for cutting metal plates having warped or uneven surfaces, but it is to be understood that various features and principles of this invention may be advantageously utilized in other apparatus, as in apparatus employing a blow-pipe, an electric arc or other heating mechanism adapted for heating, repairing, welding or cutting operations generally.

In the use of hand-operated and hand-propelled blow-pipes or torches, where the metal to be operated upon has a warped or uneven surface, it is difficult, especially in cutting thick plates such as armor-plates, to keep the blow-pipe and the axis of its flame substantially perpendicular to the plane of the plate to obtain a uniform cut. Moreover, such operations on thick plates are very slow and tedious when done manually. Self-contained power-operated blow-pipes now in use are generally not adapted to operate unattended on uneven surfaces because they are not provided with guiding means. Such power operated blow-pipes are propelled by an electric motor mounted directly on the torch-supporting carriage and are unsuitable where no electric current is readily available. For larger blow-pipes, the weight of the carriage with the motor and blow-pipe thereon is excessive, which makes it difficult to move the apparatus about from one job to another.

Accordingly, the principal objects of this invention are to provide a blow-pipe apparatus which shall be adapted to operate upon or cut metal plates having warped or otherwise uneven surfaces; to provide an apparatus in which the blow-pipe may be guided in a pre-determined path and the rate of movement thereof may be varied at will; to provide a blow-pipe apparatus which may be readily controlled and started and stopped, and which shall be portable so that it may be readily carried from one job to another; and one which embodies a simple driving mechanism comprising a spring motor that shall adapt the device to be operated at places where no electric current or similar motive power is available.

The above and other important objects and the novel features of this invention will be apparent from the following description taken in connection with the drawings, which constitute a part of this application, and in which Fig. 1 is a side elevation of a blow-pipe apparatus embodying this invention, portions of the apparatus and the work being broken out,

Figs. 2 and 3 are, respectively, a plan view and an end elevation of the apparatus illustrated in Fig. 1, Fig. 4 is a detail view illustrating an extreme position of the carriage, parts being shown in section, Fig. 5 is a side elevation of another blow-pipe apparatus embodying this invention, Figs. 6 and 7 are views illustrating different positions of a portion of the driving or propelling mechanism of the apparatus of Fig. 5 and Fig. 8 is a diagrammatic view illustrating combinations of propelling rollers for obtaining changes of the propelling speed of the apparatus.

Generally speaking, the apparatus embodying this invention comprises a blow-pipe B or other torch that utilizes heating gas with or without oxidizing gas, as for example, acetylene with or without oxygen, rendering the device capable of use as a metal heating, welding or cutting apparatus. The blow-pipe is desirably mounted upon a suitable carriage C that may be propelled by a suitable motor M along the surface of the metal plate or work W to be operated upon. In order that the blow-pipe may be maintained in proper heating, welding or cutting relation to the surface or work W, the arrangement is such that the carriage may readily conform to the distortions of said surface. This is accomplished in the present apparatus by arranging the driving connections between the motor and the carriage so as to allow the carriage to have a free and substantially universal movement while it is being propelled in a predetermined path by the motor. The motor may or not be mounted independently of the carriage, and is desirably, though not essentially, a spring motor, so that it may be employed at places where no electric current, steam, compressed air or similar motive force is available.

Referring to Figs. 1 to 4 inclusive, the blow-pipe B may be of any suitable or preferred construction and, as herein illustrated, is one that is adapted to utilize heating gas, such as acetylene, with or without oxidizing gas, such as oxygen, and is adapted to be supported with its longitudinal axis and the flame issuing therefrom at a predetermined angle, say perpendicularly, to the surface of the plate W to be heated, welded or cut. The particular apparatus herein shown as embodying the invention is adapted for cutting armor plate which has been tested by being pierced by projectiles, such piercing having distorted the armor plate. The carriage C is adapted to support the blow-pipe B in an upright position and move it along the surface to be operated upon, being provided with an integral vertical sleeve-like clamping portion 10 on its upper side 11, having perforated ears 12 adapted to receive a clamping bolt and nut 13 by means of which the blow-pipe is securely mounted on the carriage. The blow-pipe is, of course, provided with the usual control valves and gas and cooling water passages and connections, as desired.

The body of the carriage C is of substantially inverted U-shape construction, being formed of sheet metal and having depending limbs 14 at the ends of the horizontal portion 11 and a rearwardly and upwardly extending perforated bearing lug 15 at the edge of such horizontal member 11 between the limbs 14. Suitable means may be provided for movably supporting the carriage C upon the surface to be operated upon, and as herein illustrated, wheels 16 having V-shape treads, are rotatably supported on studs 17 riveted to and projecting outwardly from the outer sides of the limbs 14. The wheels and their bearings being mounted on the outer sides of the limbs 14, are shielded by the latter from the heat and flame of the torch, the tip b of which is disposed substantially midway between said limbs and has its axis intersecting the axis of said wheels. When the carriage and torch are moved to the edge of the plate, the wheels 16 roll off the plate and suitable means should, therefore, be provided to support the carriage at the edge of the plate before and after the wheels 16 have passed onto or off of the plate. A desirable arrangement for this purpose comprises projections 14' extending forwardly and rearwardly from the lower ends of the main portions of the limbs 14 and a sufficient distance beyond the wheels 16 to engage the edge of the plate and support the carriage and torch thereon before and after the wheels engage the plate.

Suitable means may be provided for moving the carriage and the torch thereon along the surface of the plate or plates to be operated upon, and as illustrated, a motor M of any suitable type may be provided but preferably consists of a spring motor of the usual or any preferred type, the spring of which may be wound up manually by means of a hand crank 20. The spring motor is encased and may be stationarily mounted adjacent the work or, as shown, may be clamped thereto by suitable clamps 21 adapted to engage the plate W and a projecting portion of a plate 22 that is secured to the top of the motor case. The spring motor M may include suitable power transmitting means such as a vertical shaft carrying a worm 23 and the usual or any preferred form of adjustable device 24 may be provided for varying the speed of the spring motor and the worm 23 driven thereby.

The driving power may be transmitted from the motor M to the carriage C by suitable means so arranged that the rate of movement of the carriage shall be uniform or at the desired speed and that the carriage and the torch thereon shall be universally movable so that the carriage may adjust itself and the torch thereon to the irregularities of the plate surface upon which it is operated. The particular arrangement herein illustrated is an advantageous one for this purpose and comprises a driving connection between the motor and carriage enabling the motor to effect an uninterrupted propulsion of the carriage and at the same time enabling the carriage to always conform to the distortions of the plate surface. The carriage may be connected to the motor by means which comprises a member, the active length of which changes as the carriage is moved along its supporting surface, and in the particular arrangement illustrated, this member comprises a pull-rod or tension transmitting member R which is secured to the lug 15 of the carriage and passes between cooperating rollers or drums 26 and 27 which have opposed grooved knurled friction surfaces 26' and 27' for gripping the rod R to move it longitudinally of its axis. The roller 26 upon which the rod R rests, is desirably the driving roller or drum, whereas the opposed cooperating roller 27 is an idler roller and serves to guide the rod R and press or clamp it against the roller 26 during the rotation of the latter. The roller 26 is keyed to a shaft 28 which is rotatably mounted in the upright members f, f' of a frame F that is secured to the top plate 22 of the motor. One end of the shaft 28 projects into a gear case 29 secured to the motor and is coupled to a worm gear 30 in said case meshing with the worm 23.

The spring motor M may thus drive the feed wheel 26 through the gears 29 and 30 and the shaft 28.

The opposed cooperating roller 27 is disposed vertically above the roller 26 and is freely rotatable on the stud 31 that is carried by the top member 32 of the frame F. The roller 27 may normally be yieldingly pressed toward the roller 26, as by means of a spring 33 that has one end bearing against a washer 33' carried by a bolt 34 which passes through a hole in extension 35 of the lower frame member f' and has a head 34' bearing against said extension. The tension of the spring 33 may be varied by an adjustable nut 36 threaded on one end of the bolt. Normally, as illustrated in Fig. 3, the rod R is clamped between the rollers 26 and 27 and the roller 26 is free to rotate and pull or push the rod and the carriage and torch connected to it over the work.

The operation of the apparatus may be readily controlled so as to interrupt the travel of the carriage and simultaneously stop the motor. The simple and effective method illustrated comprises a lever 38 that is pivoted at 39 on the upper frame member 32 and has a rounded lower end 40 that is adapted to engage the breaking and camming surface 41 of the brake-wheel D fixed upon or keyed to the main drive shaft 28. The operation of the control lever 38 stops the motor and raises the idler roll 27 out of engagement with the rod R because, as illustrated in Fig. 3, the movement of the upper end of the lever 38 to the left causes the lower rounded end 40 to engage the braking and camming surface 41 to stop the rotation of this wheel and the driving mechanism generally and at the same time, by virtue of the camming action, of the wheel 41, the upper frame member 32 is raised with the roll 27 thereon against the tension of the spring 33, thus interrupting the transmission of power from the power means or motor through the rod R to the carriage carrying the blow-pipe.

It will be observed that inasmuch as the pull-rod R rests on the drive roll 26 practically at its point of tangency therewith, the carriage connected to the outer end thereof is free to rise and descend in accordance with the irregularities of the plate surface during the travel of the carriage and the operation of the apparatus. Furthermore, the pull-rod R passes through a bearing 15' on the lug 15 and is held in connected relation to said lug by a fastening device 44 and a washer 45. This connection of the pull-rod R to the carriage C is therefore, such that the carriage may also rock laterally about the axis of the pull-rod to conform to irregularities of the plate surface. Accordingly, the carriage C is free to swing about axes substantially parallel and perpendicular to its direction of travel and thus has substantially a universal movement which will enable it to conform to all distortions of the plate surface upon which the blow-pipe is operating.

On work that is more than about 4 feet across from the torch to the motor, the control lever 38 is not within reach of the attendant who may be adjusting the torch for starting the machine and, for such work, an arrangement may be provided in which the control lever is accessible to an attendant who cannot conveniently reach the control device associated with the motor. Figs. 5, 6 and 7 illustrate such an embodiment of my invention, comprising a control device which has the operating lever thereof disposed adjacent the torch and carriage. A pull-rod R' may be provided that is rectangular in cross section, except the cylindrical end thereof that is rotatably mounted in the bearing 15' on the bracket lug 15 of the carriage. The pull-rod R' passes between the cylindrical faces 261' and 271' of driving and idler rolls 261 and 271 respectively, and power is transmitted therethrough to the carriage by the said rolls when the pull-rod is in the position illustrated in Fig. 6. The faces 261' and 271' may either or both be knurled to grip the rod R'. The shaft 281 is operatively connected to a spring or other type of motor, in the manner similar to the apparatus shown in Figs. 1 to 4. The rollers 261 and 271 have flanges 261'' and 271'' which, during the operation of the machine, are spaced apart. The narrow side of the rectangular pull-rod R' is of less width than the distance between the faces 261' and 271' when the flanges 261'' and 271'' are in engagement, as in Fig. 7, and so that by simply turning the pull-rod R' about its axis through an angle of 90°, the lower wide side of the rod will rest on the surface 261' but the surface 271' will not engage the upper side of it and, in the absence of the clamping effect of the roller 271, there will be insufficient friction or power transmitted to the rod R' to pull or push it and the carriage along the plate. In the arrangement illustrated, the rod R' may be turned about its axis by means of the control lever 381 which is secured to the rod at a point near the carriage. Provision is also made for stopping the motor simultaneously upon interruption of the movement of the carriage and the rod. This may be effected by means of an adjustable brake member or shoe 50 that is threaded in the frame member 321 and adapted to engage the face of a brake-wheel 51 fixed on the shaft 281, when the pull-rod R' is turned so as to interrupt the propulsion of the carriage, as illustrated in Fig. 7. The frame member 321 that carries the brake shoe or stud 50 and the roller 271 may normally be pressed downwardly toward the roller 261 by a spring 331 on a bolt 341, so that when the rod R' is turned from the position shown in Fig. 6 to the position shown in Fig. 7, the brake member 50 will immediately be forced into engagement with the brake-wheel 51 to stop rotation of the roller or drum 261 and the drive shaft 281 and the motor geared to it.

The cooperating grooved rollers 26, 27, as well as the cooperating flanged rollers 261, 271, serve as means for guiding the rod in a substantially rectilinear or predetermined path, since the sides of the grooves or the flanges restrain lateral movement of the pull-rod passing between them. As illustrated, the rods are desirably sectional, being made up of lengths of rigid steel rods joined together by suitable joints which will transmit the power therethrough. It will be understood that although rigid power transmitting rods are herein employed between the motor and the carriage, with cooperating rotatable propelling rollers 26 and 27 therefor, other, though less advantageous means, may be employed to obtain substantially the same result, as for example, cable and drum driving connection means may be interposed between the motor and the carriage, with the drum operated by the motor and the cable connected to the carriage and arranged to be wound on the drum.

The spring motor power means has special advantages in the present invention in that it is simple and inexpensive, may be readily installed and used where no other power is available and, when the control device is in "off" position, no energy will be wasted because the motor is stopped, but other forms of power may of course be employed in certain instances, such as electric, steam or gas motors or line shafting equipped with fast and loose pulleys. The improved power means and propelling mechanism embodying the present invention may of course also be employed to operate a carriage carrying metal heating means operable by electric current, as an electric arc welding head for example, instead of an oxyacetylene blow-pipe, but such power means and mechanism has distinct advantages when employed in connection with an oxyacetylene metal-cutting head, as herein illustrated and described.

The speed at which the carriage and the torch thereon may be moved along the work in cutting operations depends primarily on the thickness of the work to be cut and the pressure of the gases employed. Various carriage speeds are required for various thicknesses of work and in order to provide a satisfactory range of speeds, means are provided whereby the apparatus may be adapted to be operated at any one of a number of speeds. In the apparatus illustrated, a suitable range of speeds is obtained, with the adjuster 24, by employing one set of rollers 26, 27 and another set of rollers 55, 55 as shown in Fig. 8. By employing the smaller roller 27 as the driver and the larger roller 26 as the idler, slow speed propulsion may be obtained, and by interchanging these rollers, as indicated in the view at the right, high speed may be obtained. The rollers 55, 55 may be of the same size and of a diameter that is intermediate the diameters of the rollers 26 and 27 so that by substituting them for the latter, intermediate speeds may be more readily obtainable.

While the improved blow-pipe apparatus embodying this invention has been shown and described in detail, it is to be understood that various features thereof may be modified without departing from the invention or sacrificing the advantages of the principles thereof.

I claim:

1. In a machine of the class described, the combination of heating means, a carriage solely supported by wheel means and adapted to carry said heating means along a surface to be heated, stationary power means independent of said carriage, and driving connection means between said power means and carriage enabling said power means to effect the movement of said carriage and the heating means thereon along said surface and also enabling said carriage to conform to longitudinal and transverse irregularities of said surface.

2. In metal welding or cutting apparatus, the combination of metal heating means, a wheel supported carriage adapted to support said heating means adjacent the work or surface to be operated upon, stationary power means, said carriage and said power means being supported independently of each other, and driving connection means between said power means and said carriage enabling said power means to effect the movement of said carriage and said heating means along said surface and also enabling said carriage to conform to longitudinal and transverse irregularities of said surface.

3. In blow-pipe apparatus, the combination with a blow-pipe or torch for delivering gas for heating or cutting, of a carriage having wheel means supporting the same and said blow-pipe adjacent the surface to be operated upon, a stationary motor mounted independently of said carriage, and driving connection means between said motor and carriage enabling said motor to pull said carriage and the blow-pipe thereon along said surface and also enabling said carriage to conform to irregularities of said surface and always present the flame from said blow-pipe to said surface at substantially a predetermined angle.

4. In metal welding or cutting apparatus, the combination of metal heating, welding or cutting means, a wheeled carriage therefor adapted to support said means adjacent the surface to be operated upon, a spring motor, and driving connection means between said motor and carriage enabling said motor to propel said carriage and said means along said surface.

5. In metal welding or cutting apparatus, the combination of metal heating means, a wheeled carriage adapted to carry said heating means along a surface to be operated upon thereby, a spring motor, driving means enabling said motor to propel said carriage along said surface during the operation of said heating means, and means for controlling the speed of said carriage.

6. In metal welding or cutting apparatus, the combination of metal heating means, a carriage adapted to support said heating means adjacent the work or surface to be operated upon, power means mounted independently of said carriage, and driving connection means between said power means and said carriage enabling said power means to effect the movement of said carriage and said heating means along said surface and also enabling said carriage to conform to irregularities of said surface, said driving connection means comprising means whereby said carriage is free to rock about an axis extending substantially longitudinally of the direction of its movement by said power means.

7. The invention defined in claim 2 in which said driving connection means comprises means enabling said carriage to rock about an axis substantially perpendicular to its direction of travel.

8. In metal welding or cutting apparatus, the combination of metal heating means, a carriage adapted to support said heating means adjacent the work or surface to be operated upon, power means mounted independently of said carriage, and driving connection means between said power means and said carriage enabling said power means to effect the movement of said carriage and said heating means along said surface and also enabling said carriage to conform to irregularities of said surface, said driving connection means comprising means enabling the said carriage to rock about axes substantially parallel to and perpendicular to its direction of travel.

9. The combination with a carriage having wheels supporting the same and adapted to carry mechanism adjacent to a surface or work to be operated upon, of stationary power means mounted independently of said carriage, and driving connection means between said power means and said carriage enabling said power means to effect the movement of said carriage and mechanism along said surface and also enbling said carriage to conform to transverse and longitudinal irregularities of said surface.

10. In metal welding or cutting apparatus, the combination of metal heating means, a carriage adapted to support said heating means adjacent the work or surface to be operated upon, power means mounted independently of said carriage, and driving connection means between said power means and said carriage enabling said power means to effect the movement of said carriage and said heating means along said surface and also enabling said carriage to conform to irregularities of said surface, said heating means comprising a blow-pipe, said carriage being provided with wheels supporting it on the surface to be heated, said power means comprising a stationary motor, and said driving connection means comprising devices operatively connecting said motor to said carriage and enabling the latter to have a substantially universal movement while it is being propelled by said motor.

11. The invention claimed in claim 9 in which said driving connection means comprises a member, the active length of which changes as the carriage is moved along said surface.

12. The invention claimed in claim 9 in which said driving connection means comprises a pull or tension transmitting member, the active length of which decreases as the carriage is moved along said surface by said power means.

13. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said power means comprising a stationary motor, and said driving connection means comprising a rod to which said carriage is rockably connected the active length of said rod changing as it and said carriage are moved along the work by said motor.

14. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising flexibly connected power transmitting members.

15. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising rotatable means and pull or tension transmitting means between said carriage and said power means and operated by the latter.

16. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising a sectional power transmitting rod or bar.

17. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising means for interrupting the movement of the carriage and the operation of said power means.

18. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising cooperating rollers, a power transmitting rod connected to said carriage and extending between said rollers, and means whereby said rollers are moved so as to interrupt the transmission of power therefrom through said rod to said carriage.

19. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said power means comprising a stationary motor, and said driving connection means comprising friction applying means for simultaneously interrupting the movement of said carriage and stopping the operation of said motor.

20. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising a lever for simultaneously interrupting the movement of said carriage and stopping the operation of said power means.

21. The combination with a carriage adapted to support the mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising a pair of cooperating rollers, one of which is driven by said power means, a power transmitting rod connected to said carriage and extending between said cooperating rollers, and means for simultaneously stopping said power means and displacing said rollers so as to interrupt the transmission of power therefrom through said rod to said carriage.

22. The combination with a carriage adapted to support mechanism adjacent to a surface or work to be operated upon, of power means mounted independently of said carriage and driving connection means between said power means and said carriage enabling said power means to effect the movement of said carriage and mechanism along said surface and also enabling said carriage to conform to irregularities of said surface, said driving connection means comprising friction controlling means disposed adjacent to said power means for simultaneously stopping the latter and interrupting the transmission of power therefrom to said carriage.

23. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising means disposed adjacent said carriage whereby said power means may be stopped and the transmission of power therefrom to said carriage may be simultaneously interrupted.

24. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising cooperating rollers, one of which is driven by said power means and the other of which is yieldingly mounted relatively to such first mentioned roller.

25. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising a rotatable member driven by said power means, a brake device operatively connected to said rotatable member, and means adapted to engage said brake device to interrupt the delivery of power by said power means.

26. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said power means comprising a motor, said driving connection means comprising a frame, a shaft mounted in said frame and driven by said motor, a rotatable member on said shaft adapted to transmit power to said carriage, a break wheel on said shaft, and a yieldably mounted member on said frame adapted to engage said brake wheel to restrain the rotation of said shaft, said rotatable member and said motor.

27. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising cooperating power transmitting rollers which are interchangeable or reversible so as to vary the rate of movement of said carriage.

28. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said driving connection means comprising sets of cooperating interchangeable power-transmitting rollers whereby the rate of movement of said carriage may be varied.

29. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said carriage being mounted on wheels and provided with means for supporting the carriage on said surface when said wheels are moved a slight distance off of the edge of said surface.

30. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said carriage being mounted on wheels and also provided with members projecting forwardly and rearwardly of the wheels adapted to engage the surface and support the carriage thereon before and after said wheels engage said surface.

31. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said carriage comprising an inverted U-shaped member having forwardly and rearwardly projecting portions on the lower ends of the limbs thereof.

32. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said carriage comprising an inverted U-shaped member, wheels rotatably mounted on the limbs of said member to support said carriage on said surface, said limbs having projecting portions on the lower ends thereof extending forwardly and rearwardly of said wheels and adapted to engage said surface before and after said wheels engage and leave said surface.

33. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to iregularities of said surface, said carriage comprising a frame having means for clamping a heating means, a lug portion by which said carriage may be rockably connected to said driving connection means, and members carrying supporting wheels.

34. The combination with a carriage adapted to support mechanism adjacent to a surface or work to be operated upon, of power means mounted independently of said carriage, and driving connection means between said power means and said carriage enabling said power means to effect the movement of said carriage and mechanism along said surface and also enabling said carriage to conform to irregularities of said surface, said carriage comprising an inverted U-shaped member having supported wheels rotatably mounted on the exterior sides of the limbs thereof, clamping means thereon for holding a heating means on said carriage between said limbs, and rearwardly extending means for attaching said carriage to said driving connection means.

35. In welding or cutting apparatus, the combination of a carriage comprising an inverted U-shaped frame member having limbs carrying studs on the outer sides thereof, supporting wheels for said carriage mounted on said studs, a cutting or welding torch or blow-pipe, means on said carriage for mounting said torch thereon with the tip thereof adjacent the work to be operated upon and between said limbs to shield said studs and wheels from the heat of the flame, a motor, and power transmitting means operatively connected to said motor and arranged to effect the movement of said carriage and the torch thereon.

In testimony whereof, I affix my signature.

RAYMOND C. PIERCE.